(12) United States Patent  (10) Patent No.: US 9,021,963 B1
Jacobsen  (45) Date of Patent: May 5, 2015

(54) PORTABLE DOCUMENT TRANSPORT AND DESK DEVICE

(71) Applicant: Joseph Jacobsen, Ormond Beach, FL (US)

(72) Inventor: Joseph Jacobsen, Ormond Beach, FL (US)

( * ) Notice: Subject to any disclaimer, the term of this patent is extended or adjusted under 35 U.S.C. 154(b) by 0 days.

(21) Appl. No.: 14/087,053

(22) Filed: Nov. 22, 2013

(51) Int. Cl.
*A47B 23/00* (2006.01)
*A47B 3/10* (2006.01)
*A45C 9/00* (2006.01)
*B60N 3/00* (2006.01)

(52) U.S. Cl.
CPC ... *A47B 3/10* (2013.01); *A45C 9/00* (2013.01); *B60N 3/005* (2013.01); *A47B 23/00* (2013.01)

(58) Field of Classification Search
CPC ......... A47B 23/00; B60N 3/001; B60N 3/005
USPC ......................................... 108/44, 45, 42, 11
See application file for complete search history.

(56) References Cited

U.S. PATENT DOCUMENTS

| | | | |
|---|---|---|---|
| 1,883,714 A | 10/1932 | Gbay | |
| 3,051,539 A | 8/1962 | Montgomery | |
| 3,556,589 A * | 1/1971 | Messier | 297/230.12 |
| 3,643,606 A * | 2/1972 | Vise | 108/44 |
| 4,139,217 A | 2/1979 | Jamison | |
| 4,453,788 A | 6/1984 | Russell | |
| 4,995,637 A * | 2/1991 | Muraishi | 280/727 |
| 5,046,433 A * | 9/1991 | Kramer et al. | 108/44 |
| 5,060,581 A * | 10/1991 | Malinski | 108/44 |
| 5,177,665 A * | 1/1993 | Frank et al. | 361/679.43 |
| 5,558,026 A | 9/1996 | Seibert | |
| 5,662,047 A * | 9/1997 | Metcalf | 108/44 |
| 5,749,306 A * | 5/1998 | Breuner | 108/44 |
| 5,845,585 A * | 12/1998 | Meeus et al. | 108/44 |
| D443,649 S | 6/2001 | Citron | |
| D444,178 S | 6/2001 | Citron | |
| 6,442,425 B1 * | 8/2002 | Alt | 607/4 |
| 6,695,060 B1 * | 2/2004 | Guidry et al. | 166/370 |
| 8,079,312 B2 * | 12/2011 | Long | 108/44 |
| 8,327,774 B1 * | 12/2012 | Rivera | 108/44 |
| 2004/0261667 A1 * | 12/2004 | Ma | 108/42 |
| 2006/0032410 A1 * | 2/2006 | Miller | 108/44 |
| 2006/0107878 A1 * | 5/2006 | Cassata | 108/44 |
| 2007/0187565 A1 | 8/2007 | Liptan | |

* cited by examiner

*Primary Examiner* — Daniel Rohrhoff
(74) *Attorney, Agent, or Firm* — Jason T. Daniel, Esq.; Daniel Law Offices, P.A.

(57) ABSTRACT

A portable document transport and desk device includes a first generally rectangular member having a second generally rectangular member pivotally secured along a bottom end, and an extension member that is pivotally connected along a top end. A pocket is located along the inside facing surface of the first member, and a clip is located along an outside facing surface of the second member. The device transitioning between a briefcase when the first and second members are in the closed position, and a portable desk which can be hung from a steering wheel when the device is in an open position.

11 Claims, 6 Drawing Sheets

FIGURE 5B

PORTABLE DOCUMENT TRANSPORT AND DESK DEVICE

TECHNICAL FIELD

The present invention relates generally to portable devices for carrying and preparing written documents, and more particularly to a portable device that can transition between a briefcase, a clipboard and a desk that is mountable onto a vehicle steering wheel.

BACKGROUND

The statements in this section merely provide background information related to the present disclosure and may not constitute prior art.

Throughout this and other countries, there are countless numbers of vocations which require individuals to prepare documentation while on the go. Several such occupations include repair technicians, engineers, construction workers, salesmen, truck drivers and the like, who must put pen to paper in order to generate work orders, sales receipts and/or project renderings, for example. Additionally, new technology such as laptop computers and tablet devices are increasingly being utilized alongside paper documents in order to assist these individuals with performing their assigned tasks.

Although there are a number of known devices suitable for transporting and/or preparing written documents such as briefcases, clipboards and portable desks, for example, each of these devices do not work in harmony with one another, and often include redundant features. In this regard, none of these devices are particularly adapted for use within the cramped workspace of the users' vehicle which often functions as a portable office.

Accordingly, it would be beneficial to provide a portable document transport and desk device that can transition between a briefcase, a clipboard and a desk that is mountable onto a vehicle steering wheel.

SUMMARY OF THE INVENTION

The present invention is directed to a portable document transport and desk device. One embodiment of the present invention can include a first generally rectangular member that is pivotally connected to a second generally rectangular member along a bottom end, and an extension member along the top end. The device can include a pocket area located along the inside facing surface of the first member, and a clip that can be located along an outside facing surface of the second member. The first and second members can preferably transition between a substantially closed position wherein the pocket is enclosed, and a substantially open position where the first and second members are oriented approximately 90 degrees relative to one another.

Another embodiment of the present invention can include the ability to transition the extension member between an inline position so as to allow the device to function as a briefcase, and a generally perpendicular position so as to engage a vehicle steering wheel.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

As shall be described throughout this document, a portable document transport and desk device can function to replace a traditional briefcase, clipboard and portable desk, by providing a single multifunctional device. Of course, any number of additional uses will become apparent after reviewing the enclosed description and figures. Accordingly, the device is not to be construed as limiting in any manner.

FIGS. 1-4 illustrate one embodiment of a portable document transport and desk device 10 that is useful for understanding the inventive concepts disclosed herein. As shown, the device 10 can include, essentially, a first member 11, a second member 21, and an extension member 30 that are pivotally connected.

The first and second members can include substantially identically sized rectangular planar elements that are preferably constructed from a durable material such as aluminum, for example. While this is not required in all embodiments, the use of a lightweight construction material, along with substantially identically shaped and sized components can substantially decrease manufacturing costs; however, other shapes and/or construction materials are also contemplated. As such, the device 10 can be sized and shaped so as to accommodate any number of different factors such as paper size, equipment storage and the like, without departing from the scope of this disclosure, and can also include any suitable construction material such as plastic, for example, which can provide a fairly strong and light-weight panel that is relatively inexpensive to manufacture.

Figure 1:
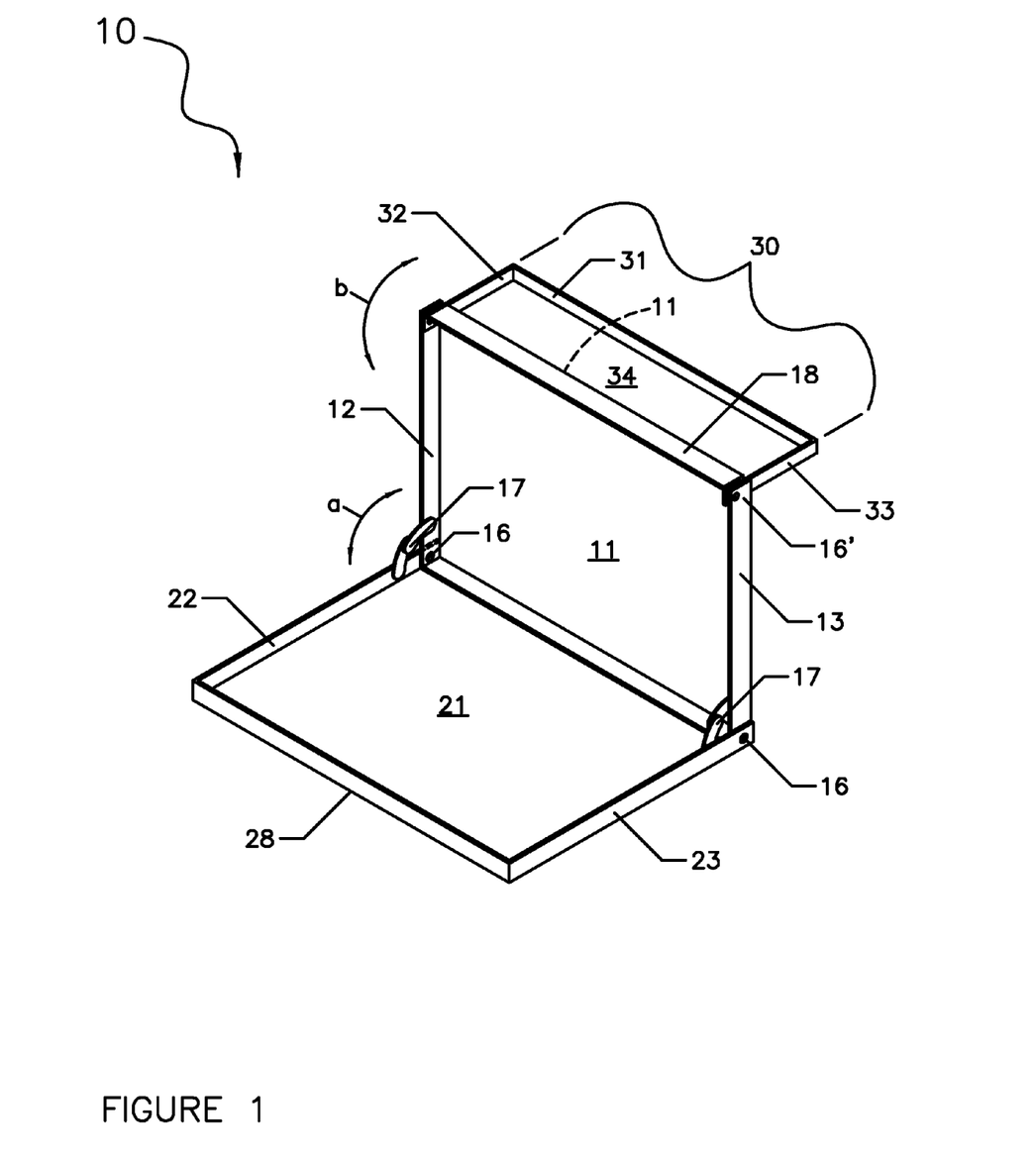
FIG. 1 is a perspective side view of a portable document transport and desk device that is useful for understanding the inventive concepts disclosed herein.

In one embodiment, the first member 11 and the second member 21 can each include a pair of elongated generally orthogonal side walls 12-13 and 22-23, respectively. As shown in FIG. 1, the interior ends of each of the side walls 12, 13, 22 and 23 can function as hinge surfaces so as to join the side walls along the left and right sides of the device 10. As the side walls 12-13 and 22-23 are substantially perpendicular to the members 11 and 21, respectively, each of the joined side walls 12 and 22, and side walls 13 and 23 can move parallel to one another as the device is folded or unfolded (See arrow a). In this regard, side walls 12 and 22, and 13 and 23 can be pivotably connected to each other via a pin, bearing assembly, and/or other suitable mechanism to form a pair of opposing hinges 16.

In addition to the above, the device 10 can also include a pair of scissor hinges 17 that are connected between the side walls 12 and 22, and 13 and 23. In one preferred embodiment, each of the scissor hinges 17 can be adjustable by a user so as to lock the hinges at any desirable position. Accordingly, the hinges 16 can function to allow the side walls to pivot relative to one another, and the scissor hinges 17 can function to limit the rotation of the side walls to any desirable angle within a range of approximately 0 and 180 relative degrees, thereby allowing the first and second members 11 and 21 to transition between the open position illustrated in FIG. 1, (90 degrees) and the closed position illustrated in FIG. 3 (0 degrees). By allowing a rotation of greater than 90 degrees, the device can function to provide a flat work surface 21 when the extension member 30 is secured to a steering wheel that is at an angled position of other than 90 degrees.

It should be understood that the illustrated hinges are non-limiting examples, and that other hinges can be used without departing from the scope of this disclosure. Lightweight hinges that do not create a bulge or other obstruction when the device is in the closed position are preferred. While the illustrated hinges are continuous with the side walls, this is not required in all embodiments. The hinge mechanism can include one or more separate pieces that are mounted to the members and/or side panels. Non-limiting examples of alternative hinges include butt hinges, knife hinges, and piano hinges, for example.

Figure 2:
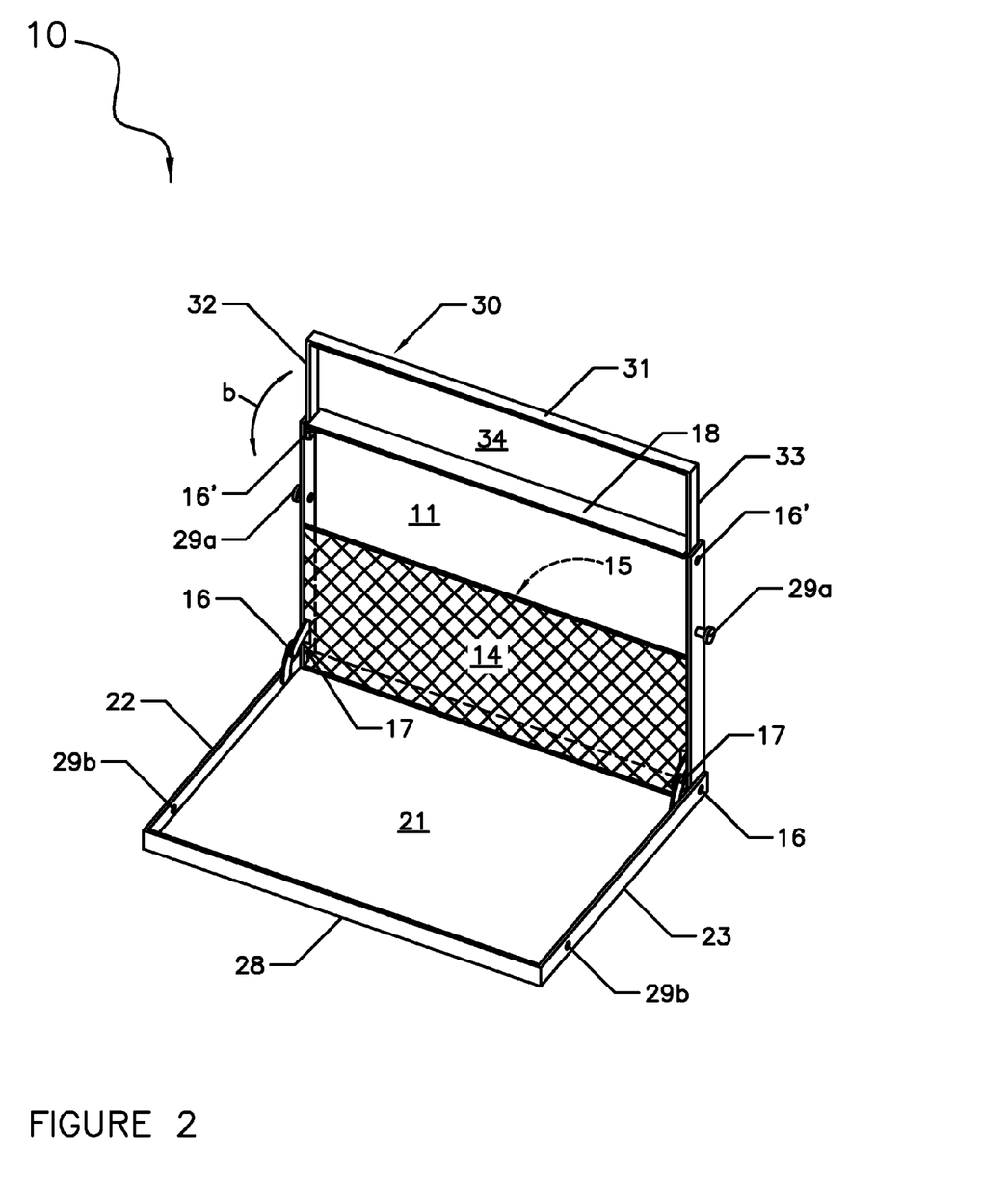
FIG. 2 is a front view of the portable document transport and desk device in an open position, in accordance with one embodiment of the invention.

As shown best in FIG. 2, a panel 14 can extend across the outer edges of each of the side walls 12 and 13, so as to form a hardened pocket 15 for storing items such as paper, business cards and/or electronic devices such as tablets and laptops, for example. Of course, the device can also be constructed with a plurality of different panels forming any number of different pocket sections of varying shapes and sizes. In one embodiment, an elongated lip 18 can be disposed along the upper inside facing surface of the first member 11. The lip functioning to prevent access to the pocket 15 when the device is in the closed position described below. Additionally, a second lip 28 can be disposed along the distal end of the second member 21. The second lip can function as a barrier for preventing items located on the second member 21 from falling off during use.

In another embodiment, the device 10 can also include one or more locking mechanisms that function to maintain the first and second members in a closed position. In one embodiment, the locking mechanisms can include spring loaded pins 29a that are disposed along the side walls 12 and 13, and a pair of corresponding openings 29b that are disposed along the opposing side walls 22 and 23, respectively. In this regard, the locking mechanism components can preferably automatically engage so as to lock the device into the closed position when so positioned by a user. Of course, any number of other locking devices capable of maintaining the device in the closed position are also contemplated. Several nonlimiting examples include locks, other known latches, snaps, and/or magnetic elements, for example.

As shown, the extension member 30 can include an elongated generally U-shaped element having a first end 32, a second end 33 and a middle portion 31 that is separated from the first member 11 so as to form an elongated opening 34. In one embodiment, ends 32 and 33 can be pivotally secured to the side walls 12 and 13 respectively via another pin, bearing assembly, and/or other suitable mechanism to form another hinge 16'. In this manner, the extension member 30 can pivot across an arc ranging anywhere between approximately 0 and 270 degrees, for example, as shown by arrow b. As illustrated, when the device is to be utilized with a steering wheel or as a portable desk, the extension member 30 will pivot in a generally opposite direction as the second member 21, relative to the first member 11.

Figure 3:
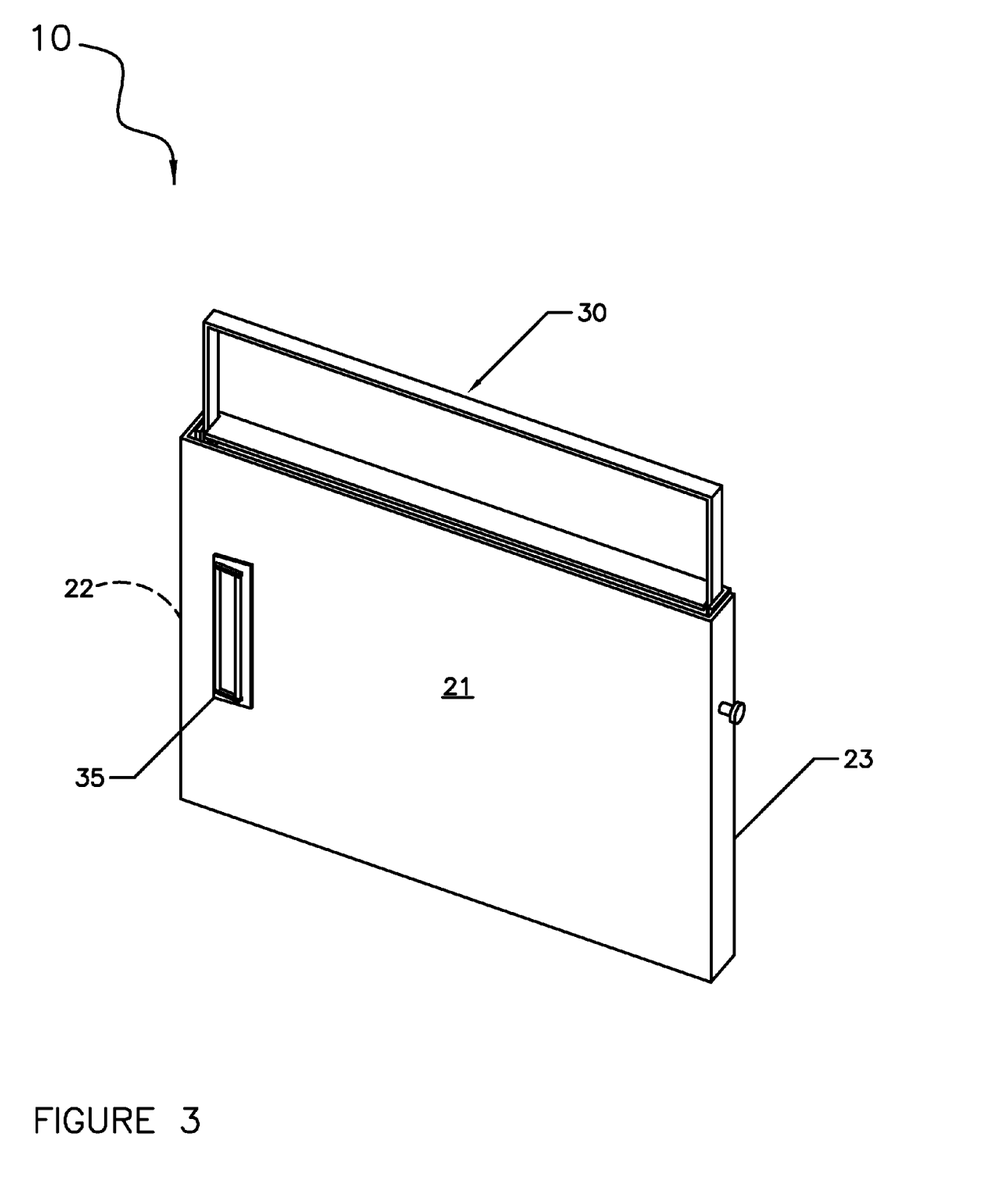
FIG. 3 is a back view of the portable document transport and desk device in a closed position, in accordance with one embodiment of the invention.

FIG. 3 illustrates one embodiment of the device 10 in a briefcase configuration for transporting documents and other such items in a secure manner. As shown, when the first and second members are folded into a closed position, the pocket area 15 is completely isolated from the outside. As such, the extension member 30 can be rotated in line with the members 11 and 21 so as to function as a carrying handle.

As further identified in FIG. 3, the device 10 can also include a clip 35 which can be disposed along an outside facing surface of the second member 21. In one preferred embodiment, the clip 35 is a spring clip sized to hold up to 50 or more pieces of paper to the outside surface of the member 21, in order to allow the device 10 to function as a clipboard. Of course, many other types of clips with other retention capacities can also be utilized, such as a low profile wire clip or a magnetic clip, for example.

Figure 4:
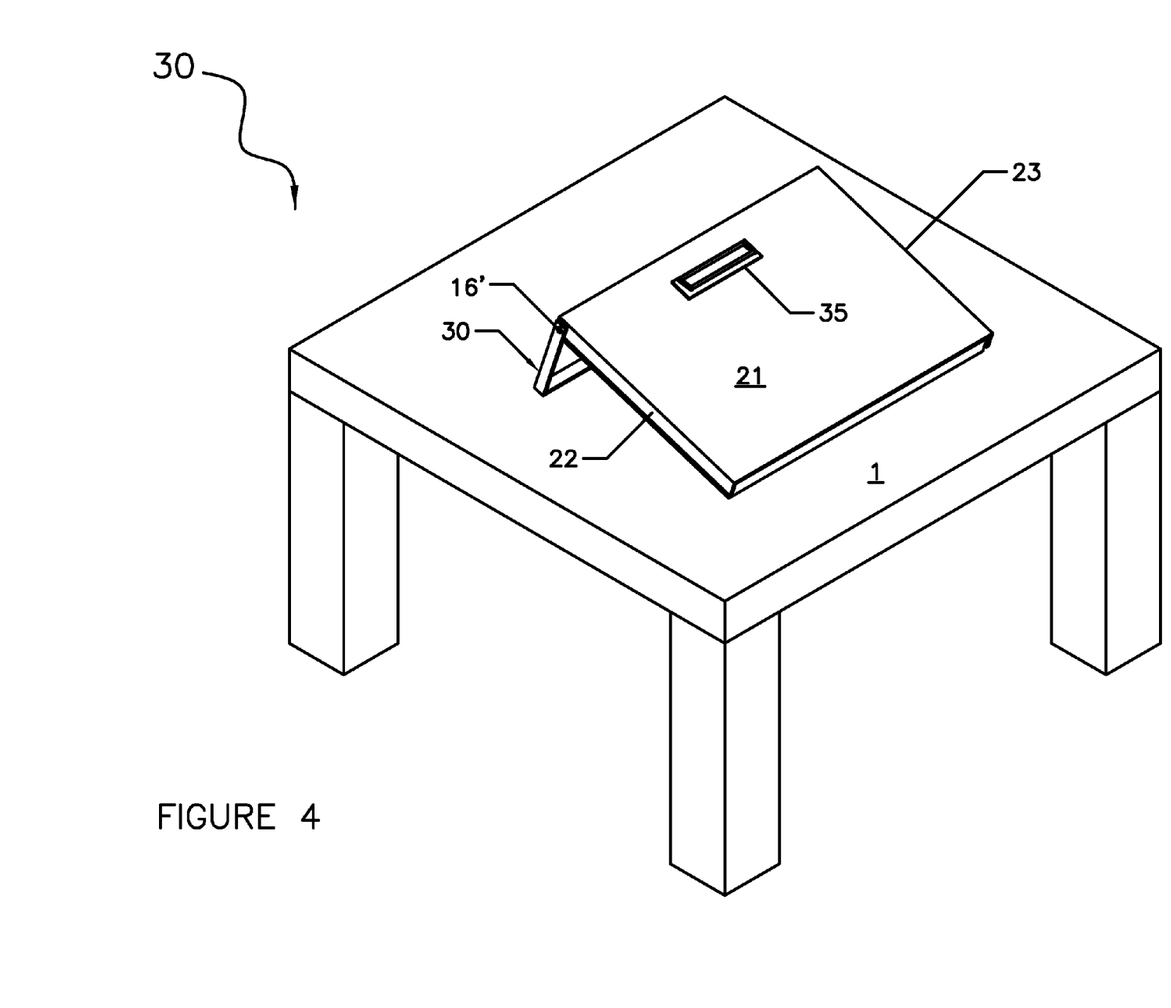
FIG. 4 is a perspective view of the portable document transport and desk device in operation as an inclined writing surface, in accordance with one embodiment of the invention.

Although illustrated as including the clip along the side of the member 21, this is for illustrative purposes only, to this end, FIG. 4 illustrates another embodiment wherein the clip 35 is positioned along the upper end of the member 21. When located in this position, the extension member 30 can be rotated perpendicular to the member 21, and the device 10 can be placed onto any generally flat surface to function as an inclined drafting table 1, for example. Such a feature can be particularly beneficial to engineers and other such professions wherein accurate drawings must be sketched in remote locations.

Figure 5A:
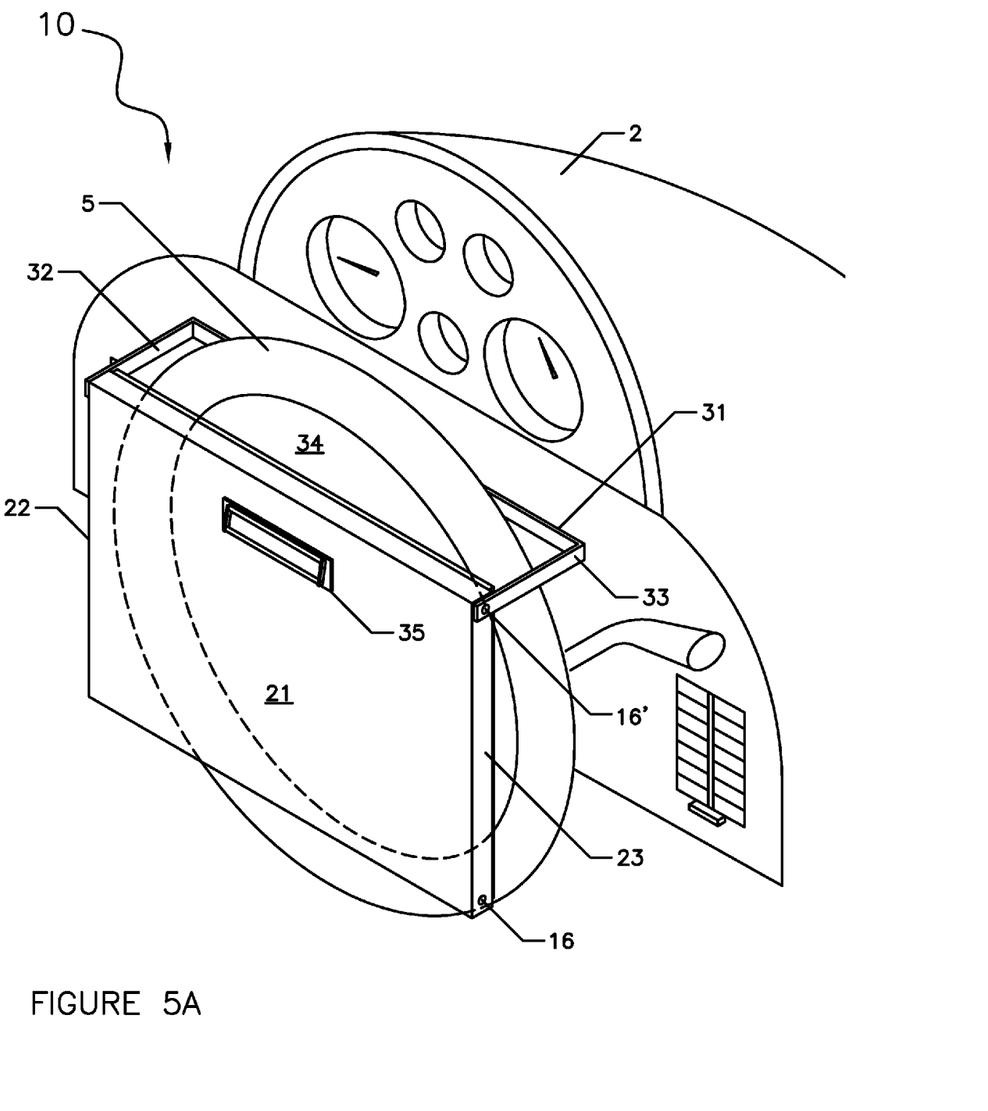
FIG. 5A is a perspective view of the portable document transport and desk device in operation as a vehicle mounted writing surface, in accordance with one embodiment of the invention.

FIG. 5A illustrates one embodiment of the device 10 in operation as a portable desk for use within a vehicle. As shown, when the extension member 30 is rotated perpendicular to the first member 11, the upper portion of a vehicle steering wheel 5 can be positioned within the elongated opening 34. At this time, papers can be secured onto the clip 35 of the back surface of the second member 21, and the device can provide a stable and smooth writing surface for preparing papers within the vehicle.

Figure 5B:
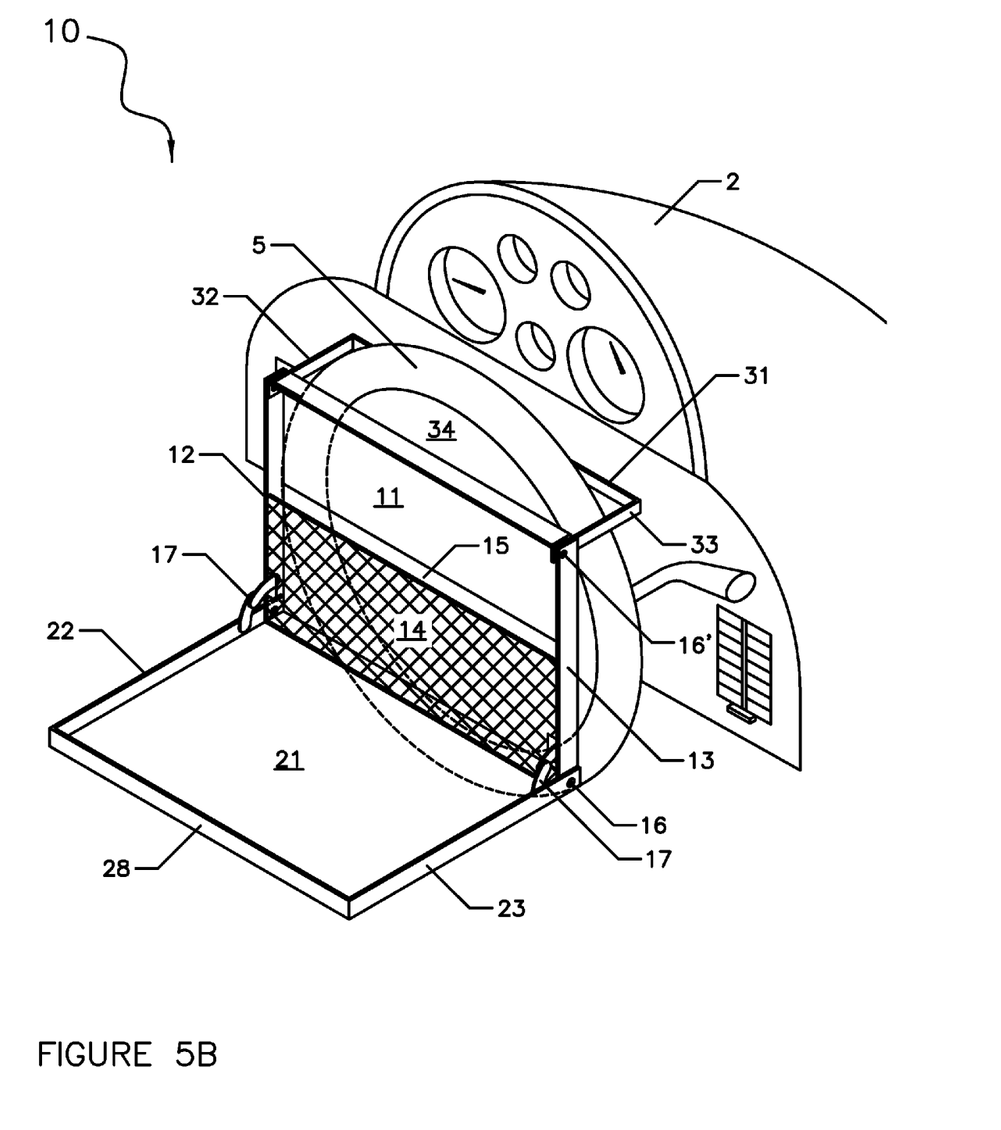
FIG. 5B is a perspective view of the portable document transport and desk device in operation as a vehicle mounted portable desk, in accordance with one embodiment of the invention.

Moreover, as shown in FIG. 5B, when the device is attached to the steering wheel 5, the second member 21 can be folded outward and locked in place via the scissor hinges 17, so as to provide a flat desktop work surface 21, an angled work surface 14 and a fully accessible document pocket 15. Such features culminating in a fully functional desk onto which a laptop and/or paper documents can be written and stored.

Accordingly, the portable document transport and desk device 10 can function to replace several traditional and redundant items with a single lightweight device in a novel manner.

As described herein, one or more elements of the portable document transport and desk device 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individual elements may be formed together as one continuous element, either through manufacturing processes, such as welding, casting, or molding, or through the use of a singular piece of material milled or machined with the aforementioned components forming identifiable sections thereof. Accordingly, in one preferred embodiment, members 11, 12 and 13 can be formed as a single aluminum component, and members 21, 22 and 23 can also be formed as a single aluminum component, of course, other materials and construction methodologies are also contemplated.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A portable document transport and desk device, said device comprising:
    a first generally planar member having an upper edge, a lower edge, and a pair of generally orthogonal side walls disposed therebetween, said first member further including a lip that is disposed along the upper edge and that is in communication with each of the pair of generally orthogonal side walls;
    a second generally planar member having an inside facing surface, an outside facing surface, and another pair of generally orthogonal side walls disposed along an outer edge of the inside facing surface;
    a pair of opposing hinges, each of said hinges pivotally connecting one of the orthogonal side walls of the first member with one of the another orthogonal side walls of the second member, said hinges functioning to transition the first and second members between an open position and a closed position;
    a clip that is secured to the second planar member along the outside facing surface; and
    a handle that consists of:
        a generally U-shaped extension member that includes a first end, a second end, and a middle section, said first and second ends being permanently and pivotally connected to the lip and each of the pair of orthogonal side walls of the first generally planar member at an upper edge thereof, and
    said middle section being separated from the upper edge of the first member forming an elongated opening, said middle section functioning to pivot across an arc of between approximately 0 degrees and approximately 270 degrees relative to the lip.

2. The device of claim 1, further comprising:
    a pair of scissor hinges that are each secured between one of the orthogonal side walls of the first member and one of the another orthogonal side walls of the second member, said scissor hinges functioning to limit a relative movement of the first and second members between approximately 0 and 180 degrees.

3. The device of claim 2, wherein the scissor hinges can accept a user input so as to lock secure the first and second members at any relative angle between 0 and 180 degrees.

4. The device of claim 1, further comprising:
    at least one pocket that is disposed along an inside surface of the first member.

5. The device of claim 1, wherein the extension member can transition between an inline position and a generally opposite perpendicular position with respect to the first generally planar member.

6. The device of claim 5, wherein the elongated opening includes a size and dimension suitable for receiving an upper portion of a vehicle steering wheel when the extension member is positioned generally perpendicular to the first generally planar member.

7. The device of claim 5, wherein said inline position consists of:
    the middle section of the extension member being positioned longitudinally with, and directly above the lip of the first generally planar member, said positioning forming a suspended handle for transporting the first and second generally planar members in a position beneath the handle.

8. The device of claim 1, wherein the clip is positioned along a side section of the second generally planar member.

9. The device of claim 1, wherein the clip is positioned along an upper edge of the second generally planar member.

10. The device of claim 1, further comprising:
    one or more latching mechanisms functioning to maintain the device in the closed position.

11. A portable document transport and desk device, said device consisting of:
    a first generally planar member having an upper edge, a lower edge, and a pair of generally orthogonal side walls disposed therebetween, said first member further including a lip that is disposed along the upper edge and that is in communication with each of the pair of generally orthogonal side walls;
    a second generally planar member having an inside facing surface, an outside facing surface, and another pair of generally orthogonal side walls disposed along an outer edge of the inside facing surface;

a pair of opposing hinges, each of said hinges pivotally connecting one of the orthogonal side walls of the first member with one of the another orthogonal side walls of the second member, said hinges functioning to transition the first and second members between an open position and a closed position;

a clip that is secured to the second planar member along the outside facing surface; and a handle having:
- a generally U-shaped extension member that includes a first end, a second end, and a middle section, said first and second ends being permanently and pivotally connected to the lip and each of the pair of orthogonal side walls of the first generally planar member at an upper edge thereof, and
- said middle section being separated from the upper edge of the first member forming an elongated opening, said middle section functioning to pivot across an arc of between approximately 0 degrees and approximately 270 degrees relative to the lip.

* * * * *